(12) United States Patent
McDonough et al.

(10) Patent No.: US 7,295,622 B2
(45) Date of Patent: Nov. 13, 2007

(54) SYSTEM AND METHOD FOR INFORMATION DECODING USING BATCHED PROCESSING OF INDEPENDENT PARAMETERS

(75) Inventors: John G. McDonough, La Jolla, CA (US); Glbong Jeong, San Diego, CA (US); Der-Chieh Koon, Encinltas, CA (US)

(73) Assignee: Texas Instruments Incorporated, Dallas, TX (US)

( * ) Notice: Subject to any disclaimer, the term of this patent is extended or adjusted under 35 U.S.C. 154(b) by 706 days.

(21) Appl. No.: 10/434,707

(22) Filed: May 9, 2003

(65) Prior Publication Data

US 2004/0223552 A1   Nov. 11, 2004

(51) Int. Cl.
   *H04L 5/12*   (2006.01)
(52) U.S. Cl. ............... 375/262; 375/265; 375/341; 714/759; 714/763; 714/769; 714/774
(58) Field of Classification Search .............. 375/262, 375/265, 340, 341, 316, 147; 714/702, 759, 714/763–766, 769, 774
   See application file for complete search history.

(56) References Cited

U.S. PATENT DOCUMENTS 6,005,898 A * 12/1999 Kaewell, Jr. .............. 375/341
6,205,187 B1 * 3/2001 Westfall .................... 375/341
6,477,677 B1 * 11/2002 Abiven et al. ............. 714/752

\* cited by examiner

*Primary Examiner*—Dac V. Ha
(74) *Attorney, Agent, or Firm*—Dolly Y. Wu; W. James Brady; Frederick J. Telecky, Jr.

(57) ABSTRACT

System and method for decoding received information using batched processing of independent parameters. A preferred embodiment comprises a decoder (for example, decoder 210) with a memory (for example, memory 215) that may be partitioned into a plurality of parts, one of which being a parameter partition (for example, parameter partition 217). A digital signal processor (for example, DSP 205) programs the decoder 210 with various ways that it wishes received data to be decoded and the decoder 210 can operate independent of the DSP 205, storing the results of each decoding operation in a specified location. At specified instances, the decoder 210 interrupts the DSP 205 to allow the DSP 205 to retrieve the decoding results.

36 Claims, 8 Drawing Sheets

SYSTEM AND METHOD FOR INFORMATION DECODING USING BATCHED PROCESSING OF INDEPENDENT PARAMETERS

TECHNICAL FIELD

The present invention relates generally to a system and method for digital communications, and more particularly to a system and method for decoding received information using batched processing of independent parameters.

BACKGROUND

In digital communications networks, data that is to be transmitted may receive processing prior to transmission with various techniques to help improve the performance of the network in the presence of noise and interference. For example, in a code-division multiple access (CDMA) cellular communications network, data bits may be pre-processed using forward error correction (FEC) techniques prior to transmission in order to combat a hostile channel environment. The data bits may be cyclic redundancy check (CRC) encoded and then appended with the CRC bits, convolutionally or turbo encoded, have their symbols repeated, punctured, and interleaved. To further help improve the performance, some networks are capable of transmitting at different data rates, with lower data rates being used in poor signal quality channels and higher data rates in high quality channels.

All of this processing prior to transmission requires that a decoder at the receiving end of the transmission be relatively complex to be able to recover the original data bits from the received transmission. A variety of parameters, such as block size, CRC length and polynomial, code rates, decoding type, symbol repetition factors, symbol puncture length and pattern, frame puncture control, logical transport unit (LTU) size, blind transport format detection (BTFD) sizes, and so forth, are needed at the decoder in order for the decoder to extract the data bits. To further complicate the decoder, each channel present in the received signal may have been processed differently therefore, there may be a different set of parameters for each channel.

A conventional decoder architecture stores a single set of decode parameters in the decoder. The conventional decoder is typically optimized to decode a block of received data as efficiently as possible. Upon receipt of a block of data, a digital signal processor (DSP) or mobile controller unit (MCU) can program the conventional decoder with a set of parameters to apply to the block of data. This may continue until the block of data is decoded. Once the decoder has completed decoding the block of data, it can interrupt the DSP to request additional blocks of data.

One disadvantage of the prior art is that the decoder stores one set of parameters. This may have been effective when only a few decodes are to be performed, but with modern communications systems, such as CDMA2000 and WCDMA, a plurality of decodes need to be performed. This leads to the DSP having to program the decoder with more and more sets of parameters within a single radio frame. This can place a heavy overhead on the DSP, which may also have a long list of complex tasks that it has to perform. The DSP, in having to frequently deal with the decoder, may not be able to complete its own tasks in a timely manner.

Another disadvantage of the prior art is that the decoder needs to interrupt the DSP each time it decodes a block of data (whether successfully or unsuccessfully). If the decode was successful, the interrupt may be to report success and to request additional data. If the decode was unsuccessful, the interrupt may be to request an additional set of parameters. Since the DSP is typically busy performing its own tasks, the DSP may not be able to respond to the interrupts as they arrive. This can lead to an increase in the frequency and length of decoder idle times.

SUMMARY OF THE INVENTION

These and other problems are generally solved or circumvented, and technical advantages are generally achieved, by preferred embodiments of the present invention which provides for a system and method for efficient decoding of information using batched processing of independent parameters.

In accordance with a preferred embodiment of the present invention, a method comprising reading a plurality of sets of decoding parameters from a memory, decoding received data based on a set of decoding parameters, storing decoding results based on the set of decoding parameters, and repeating the decoding and storing for each set of decoding parameters.

In accordance with another preferred embodiment of the present invention, a decoder comprising a decoder memory, the decoder memory to hold sets of decoding parameters provided by a control unit and results from decoding operations, a decoder engine coupled to the decoder memory, the decoder engine containing circuitry to decode received data based on specifications from a set of decoding parameters, and a decoder controller coupled to the decoder engine and the decoder memory, the decode controller containing circuitry to initiate decodes of received data in the decoder engine based on sets of decoding parameters stored in the decoder memory.

In accordance with another preferred embodiment of the present invention, a receiver comprising a control unit, the control unit to regulate the operation of the receiver, a decoder coupled to the control unit, the decoder containing circuitry to decode received data based on sets of parameters provided by the control unit, and a frame processor coupled to the decoder, the frame processor to store received data.

An advantage of a preferred embodiment of the present invention is that a DSP can program a set of parameters and then the decoder can operate independently of the DSP and decode the various channels. This reduces the interaction between the DSP and the decoder, thereby permitting the two to function more efficiently.

A further advantage of a preferred embodiment of the present invention is that a prioritized list of tasks can be created on the decoder enabling it to schedule the tasks that it needs to perform based on its needs and capabilities.

Yet another advantage of a preferred embodiment of the present invention is that the present invention can support a plurality of decoders, each capable of operating independently of one another. This can permit expedited decoding of received data.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a digital wireless communications system that is compliant to the CDMA, CDMA2000, and the UMTS (Universal Mobile Telecommunications System) technical standards. An overview of the CDMA2000 technical standard is provided in a document entitled "Introduction to CDMA2000 Spread Spectrum Systems, Release 0," which is herein incorporated by reference. An overview of the UMTS technical standard is provided in a document entitled "3$^{rd}$ Generation Partnership Project; Technical Specifications Group Services and System Aspects General UMTS Architecture (Release 4)," which is herein incorporated by reference. The invention may also be applied, however, to other digital communications systems wherein data is processed with relatively complex FEC prior to transmission and a decoder at a receiver needs to be able to decode the received signal using a wide variety of parameters in order to extract data from the received signal.

Figure 1:
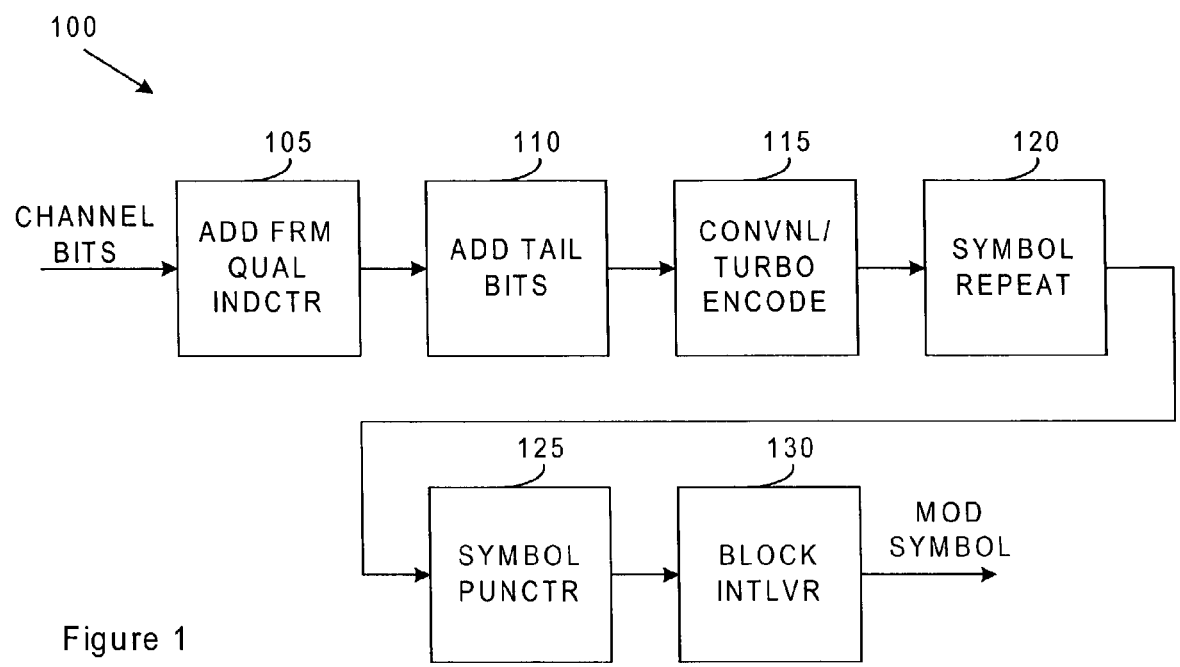
FIG. 1 is a diagram of processing steps undergone by data to be transmitted in a CDMA2000 wireless communications system.

With reference now to FIG. 1, there is shown a diagram illustrating the processing received by data bits in a CDMA2000 compliant communications system prior to transmission. Data bits, organized based on communications channel, are first combined with frame quality indicator bits and then tail bits are added for later use by an encoder. The channel bits are then encoded by a convolutional or turbo encoder (encoder type may be dependent upon channel type and data rate, for example). Additionally, the encoded channel bits can have symbols repeated and or punctured. Finally, to help decrease the probability of adjacent symbols being damaged by interference, the symbols are interleaved.

Clearly, the amount of processing that the channel bits undergo may be considerable. However, to further complicate matters, the particulars of the processing, such as the number of frame quality indicator bits, encoding rate, symbol repetition and puncturing, and interleaving factor, can vary depending on various factors. A channel's data rate, as well as the type of channel itself, can have an effect on the type of processing that the channel bits receive. Additionally, the number of bits per frame can have an effect on the type of processing received. For example, a channel in a CDMA2000 compliant communications system with 16 bits/20 ms frame may have 6 frame quality indicator bits appended and have an encoding rate of ½ plus a symbol repetition factor of eight times. Furthermore, one out of every five symbols may be punctured and an interleaving factor of 384 symbols. While another channel with a 24 bits/5 ms frame may have 16 frame quality indicator bits appended and an encoding rate of ½ plus no symbol repetition and no symbol puncturing with an interleaving factor of 96 symbols.

This can result in making the decoding operation a relatively difficult and time consuming task since each channel being received may have to be decoded in a different way. To further complicate the decoding, channels that permit symbol puncturing may be punctured in one frame and not punctured in another frame. Therefore, a decoder that requires constant attention from a DSP or MCU may not be able to achieve the best performance in terms of minimizing overhead and resource requirements.

Figure 2:
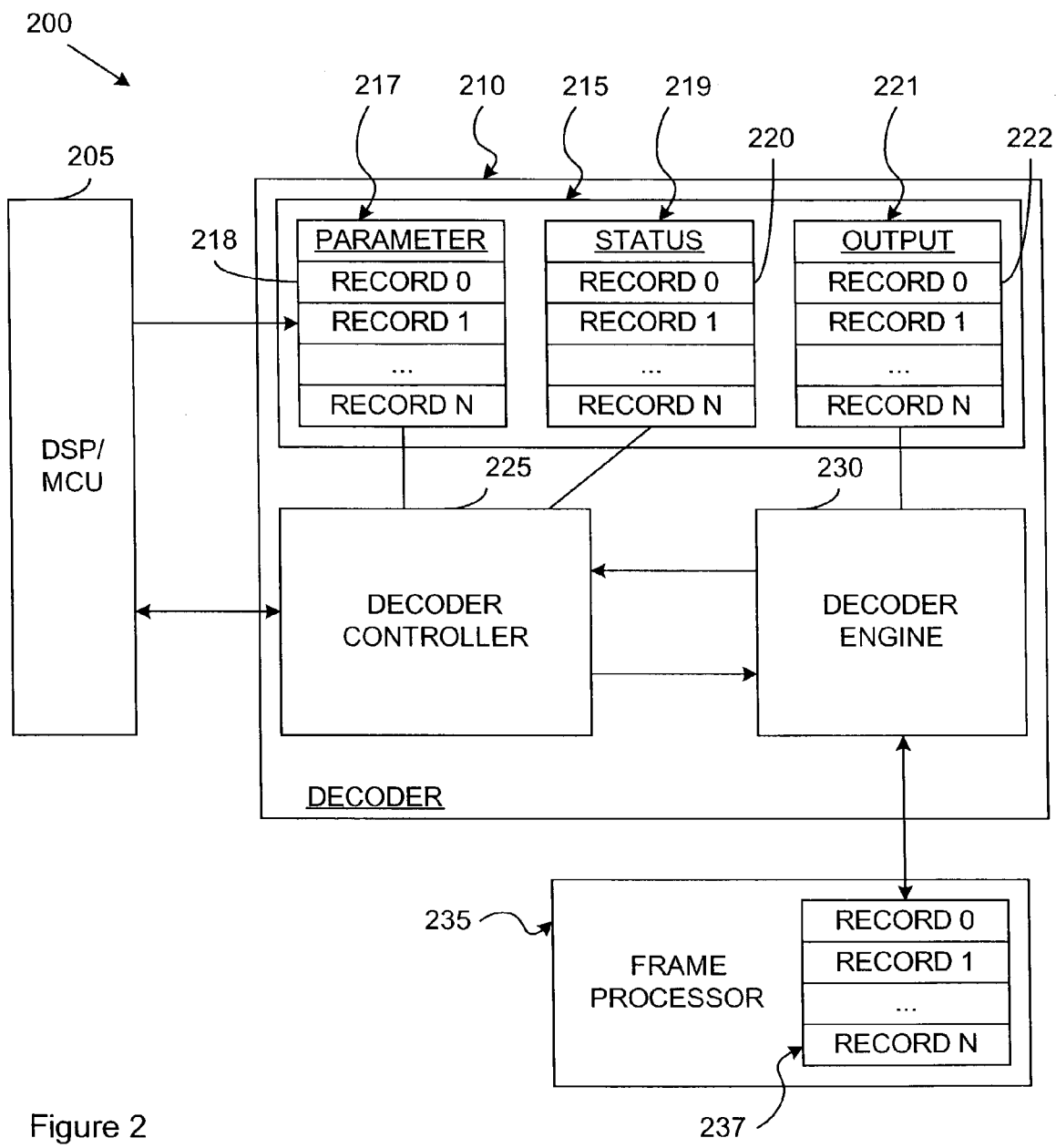
FIG. 2 is a diagram of a receiver with a decoder designed for batched processing of received data, according to a preferred embodiment of the present invention.

With reference now to FIG. 2, there is shown a diagram illustrating a portion of an exemplary receiver 200 with a detailed view of a decoder architecture with build-in support for batched processing of independent parameters, according to a preferred embodiment of the present invention. The receiver 200, as displayed in FIG. 2, includes a digital signal processor (DSP) or a mobile control unit (MCU) coupled to a decoder 210, which in turn, is coupled to a frame processor 235. The DSP 205 may be thought of as being the brains (or controller) of the receiver 200. The DSP 205 (or MCU) may be responsible for controlling the operation of the receiver, through a series of commands and application programs. The DSP 205, for example, can program the decoder 210 with a set of parameters that it can use to decode received data. The DSP 205 can also process the decoded data once the decoder 210 completes decoding. Additionally, the DSP 205 may be responsible for other aspects of receiver operation not directly involved with decoding, such as call handoffs, call initiation, user interface, and so on. Note that the DSP 205 may be replaced with a general purpose processing element, a central processing unit, an application specific integrated circuit (ASIC), a micro-controller, or so forth.

The frame processor 235 may be used combine multipath images of the transmitted signal as received by the receiver 200 to help improve the performance of the receiver 200 via increasing received signal strength among other things. The frame processor 235 may also be used for deinterleaving and rate matching. The frame processor 235 may contain a memory 237 that contains information related to the combination of multipath image. The memory 237 may also be organized based on a record basis. The frame processor 235 may also be used to store input data for the decoder 210. The frame processor 235 may contain a memory (not shown) to hold received data for a radio frame, thus making the data available for subsequent decoding by the decoder 210.

Taking a closer look at the architecture of the decoder 210, the decoder 210 includes a decoder memory 215, a decoder controller 225, and a decoder engine 230. According to a preferred embodiment of the present invention, the decoder memory 215 may be partitioned into multiple partitions, including a parameter partition 217, a status partition 219, and an output partition 221. Each of the partitions may be further sub-divided into individual entries for different records (for example, record-0 218 in the parameter partition). A record may correspond to a different code block in the received data. For example, if the DSP 205 decides to have the decoder 210 decode a certain code block several different ways, then the DSP 205 could program into several different records sets of parameters specifying how it wishes the code block to be decoded, with a typical number of records in a parameters partition being about 16.

The records in the other partitions can be used to store the status of the decoding (for example, processed, not processed, completed, not-completed, and so forth) and the output of decoding (for example, if the parameters for record-0 successfully decoded a code block based on the parameters provided by the DSP 205, then record-0 222 of the output partition can be used to store the results of the decoding). Note that record-0 220 from the status partition 219 may not correspond directly with record-0 218 of the parameter partition 217. Additionally, the number of records in one partition may not be equal to the number of records in another partition. According to a preferred embodiment of the present invention one of the parameters in a set of parameters may be to specify which record to store the status and the output of a decoding operation.

According to a preferred embodiment of the present invention, prior to the beginning of a radio frame, the DSP 205 may elect to program sets of parameters for the decoder 210 to use to decode the code blocks that will be arriving in the radio frame. The DSP 205 may then write the sets of parameters into records of the parameter partition 217 of the decoder 210.

According to a preferred embodiment of the present invention, if the DSP 205 wishes the decoder 210 to continue operation with the sets of parameters that it has already programmed into the decoder 210, the DSP 205 may not have to repeatedly write the same sets of parameters. It is only when the DSP 205 wishes to change one or more sets of parameters that the DSP 205 may have to write to the decoder 210. Additionally, the DSP 205 may write the sets of parameters for the various code blocks any order and then provide to the decoder 210 (specifically, the decoder engine 225) a prioritized list (not shown) of the order in which it wishes the decoding to take place. Alternatively, the DSP 205 may write the sets of parameters into the decoder memory 215 in a prioritized fashion, with higher priority parameters listed above lower priority parameters. In this case, the DSP 205 does not have to provide a prioritized list.

In order to support the writing of a new set of parameters without having the decoder 210 stall, the parameter partition 217 may be implemented as a "ping-pong" memory. The parameter partition 217 may be made up of two parts, each identical to the other. Then, when the DSP 205 wishes to have the decoder 210 process the received data in a subsequent frame differently, it simply writes the sets of parameters to the part of the parameter partition 217 that is not being used. Then, when the subsequent frame begins, the decoder controller 225 will read the parameters from the newly written part of the parameter partition 217. Note that the DSP 205 may write the sets of parameters during one radio frame for use in the next radio frame. The use of a "ping-pong" memory is considered to be well understood by those of ordinary skill in the art of the present invention. Note that it is possible to use more than two parts in the parameter partition 217.

The decoder 210 can then begin operations at the beginning of the radio frame. The decoder controller 225 may scan through the first entry in the prioritized list to determine which channels it needs to decode first and which channels may be skipped. The decoder controller 225 may then fetch the parameters for those channels and start the decoding in the decoder engine 230. Based upon system parameters such as input data locations for each channel of received data, the decoding engine 225 may fetch appropriate received data from the frame processor 235. The status and output of the decoding can be reflected in the status partition 219 and output partition 221 of the decoder memory 215.

After one decoding operation completes, the decoder controller 225 may return to the prioritized list to select the next decoding operation. The decoder controller 225 can continue to do this until it has exhausted the prioritized list. Periodically, or as specified by the DSP 205 in the parameters, the decoder controller 225 may assert an interrupt to the DSP 205. At which time, the DSP 205 may read out decoded data from appropriate output partition records as specified by the DSP 205 in the parameters.

Figure 3A:
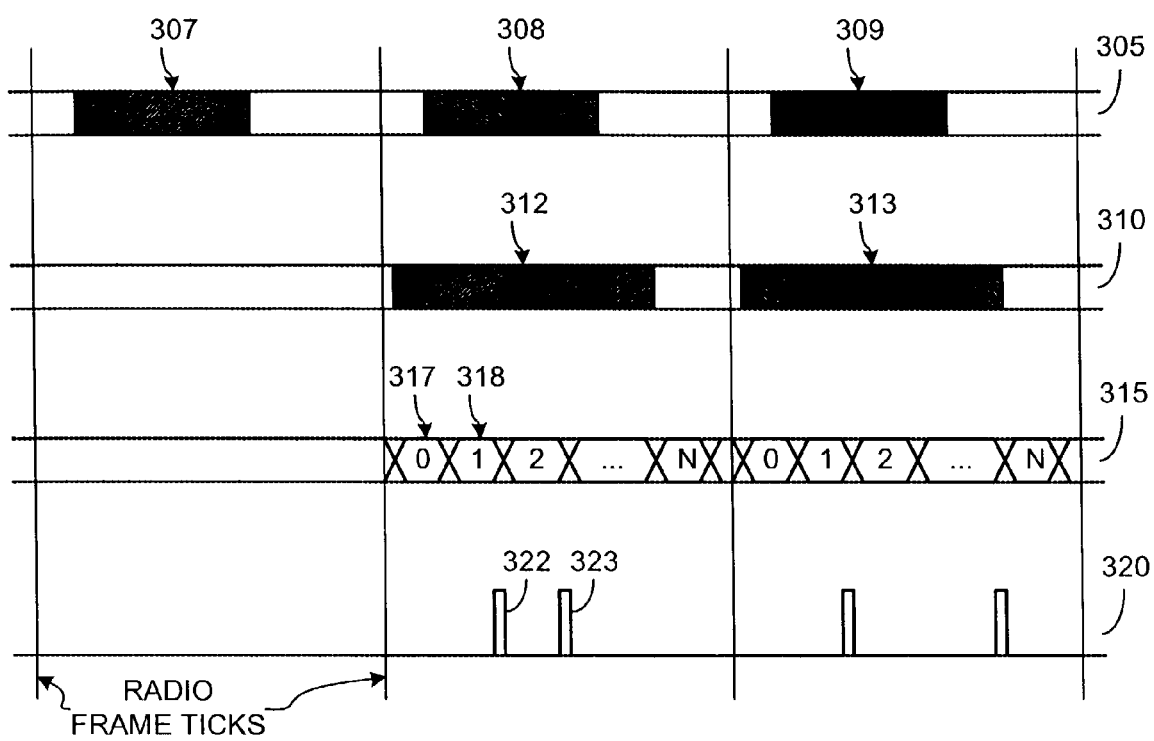
FIGS. 3*a* and 3*b* are timing diagrams of interaction between a digital signal processor and a decoder, according to a preferred embodiment of the present invention.
Figure 3B:
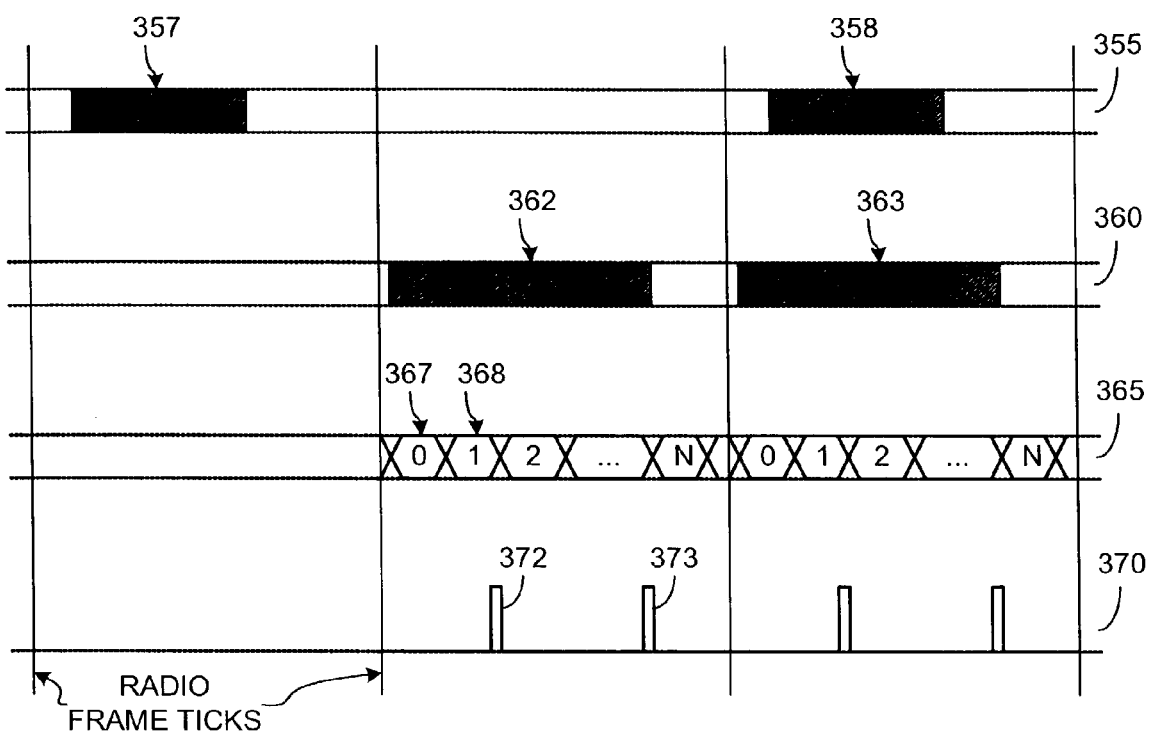

With reference now to FIGS. 3a and 3b, there are shown timing diagrams illustrating interaction between a DSP and a decoder, according to a preferred embodiment of the present invention. According to a preferred embodiment of the present invention, the timing diagrams illustrated in FIGS. 3a and 3b display some of the interaction between a DSP (for example, the DSP 205 (FIG. 2)) and a decoder (for example, the decoder 210 (FIG. 2)) along with some of the decoding operations performed by the decoder 210, with reference to the arrival of radio frames which may be received from an over-the-air transmission.

With reference now to FIG. 3a, a first timing trace 305 displays the programming of a parameter partition by the DSP 205. Note that the vertical lines spanning the various timing traces indicate radio frame ticks, i.e., the beginning and ends of individual radio frames. The first timing trace 305 shows the DSP 205 programming (writing) sets of parameters to a parameter partition (for example, the parameter partition 217 (FIG. 2)). For example, for a portion of time indicated by a shaded box 307, the DSP 205 is shown programming sets of parameters to part A of the parameter partition 217. Later on, in the next radio frame, a portion of time indicated by a shaded box 308, the DSP is shown programming sets of parameters to part B of the parameter partition 217. According to a preferred embodiment of the present invention, when the DSP 205 wishes to make a change to one or more of the sets of parameters for use during the decoding operation for a particular radio frame, the DSP 205 should write those sets of parameters to partition memory 217 during a radio frame immediately prior to the particular radio frame.

Note that while the DSP 205 may not wish to change every set of parameters that is currently programmed in the decoder 210, since the DSP 205 may be writing to a different part of the parameter partition 217, it may be simpler to write every set of parameters to the different part of the parameter partition 217. This may help to simplify implementation of the parameter partition 217 wherein when the sets of parameters are to be changed, only a newly programmed part of the parameter partition needs only to be activated.

A second timing trace 310 displays the decoder 210 reading from the parameter partition 217. The second timing trace 310 displays the reading of the parameter partition 217 by the decoder 210. After the beginning of a new radio frame, the decoder 210 begins operation by first parsing through the prioritized list provided by the DSP 205 (this operation is not displayed in FIG. 3a). Once it has processed the prioritized list, the decoder 210 begins by reading a set of parameters from a record in the parameter partition 217 that corresponds to the highest priority item in the prioritized list and begins decoding. The reading of the parameters from the parameter partition 217 is illustrated as a shaded box 312. Note that once the decoder 210 begins to decode, it may likely stop accessing the parameter partition 217. However, to simplify the illustration, the shaded box 312 is shown as a single continuous access with no stoppages while the decoder 210 is decoding. Note also that the decoder 210 reads the sets of parameters from the part of the parameter partition 217 that was most recently written to by the DSP 205, in this example, part A of the parameter partition 217 is the most recently written to part.

A third timing trace 315 displays the decoder 210 decoding the received data. The second timing trace 315 displays the decoder 210 decoding received data using sets of parameters it has received from the parameter partition 217. For example, interval #0 317 may correspond to the decoder 210 decoding the highest priority item in the prioritized list provided by the DSP 205 while interval #1 318 may correspond to the decoding of the second highest priority item in the prioritized list, and so on. Note that while the third timing trace 315 displays that the decoder 210 processes a total of N+1 (0 to N) items in each of the two radio frames displayed in FIG. 3a, it is possible for the prioritized list to have a different number of items for each radio frame.

A fourth timing trace 320 displays assertions of interrupts from the decoder 210. The interrupts (for example, pulses 322 and 323) may be intended for the DSP 205 to let it know that the decoder 210 has completed certain tasks. According to a preferred embodiment of the present invention, the DSP 205 may specify the frequency of the interrupts. For example, the DSP 205 may tell the decoder 210 to assert an interrupt after every three items from the prioritized list that it has completed. Alternatively, the DSP 205 may tell the decoder 210 to assert an interrupt after it completes certain items. For example, if a particular code block may have one of four different data rates, the DSP 205 may instruct the decoder 210 to assert an interrupt after it has processed the code block all four different data rates. Note that the number of interrupts that the decoder 210 will assert may be fully dependent upon the programming provided by the DSP 205. Therefore, the DSP 205 may be able to ascertain a maximum number of interrupts that it can service during a duration equal to a radio frame and program the decoder 210 to issue a number of interrupts that may be equal to or less than the maximum number.

With reference now to FIG. 3b, a first timing trace 355 displays the programming of a parameter partition by the DSP 205. The first timing trace 355 shows the DSP 205 programming sets of parameters to the parameter partition 217 during a first radio frame duration. A shaded box 357 illustrates the DSP 205 programming the parameter partition 217. In the following radio frame, the DSP 205 does not need to change any of the sets of parameters, so it does not need to program the parameter partition 217. Note that since the parameters were not changed, the decoder 210 may retrieve its needed parameters from the part A of the parameter partition 217. Then in a third radio frame, the DSP 205 may make a change to at least one of the sets of parameters and as a result, it programs the parameter partition 217. The programming is illustrated as a shaded box 358. Note that since part A of the parameter partition 217 may currently be used, the DSP 205 programs the part B of the parameter partition 217.

The decoder architecture discussed in FIG. 2 is a highly flexible architecture that minimizes processing overhead on a DSP that is used to control its operation. Therefore, it is possible to connect a plurality of decoders to a single DSP to improve the decoding performance. For example, in modern communications networks, where a received signal may be made up of a plurality of channels, with each channel possibly being encoded differently, a single decoder may not be able to fully decode all of the channels in a radio frame before another radio frame begins to be received. Due to the relatively low processing overhead placed on the DSP, decoding performance may be enhanced by using the DSP to control more than one decoder.

Figure 4:
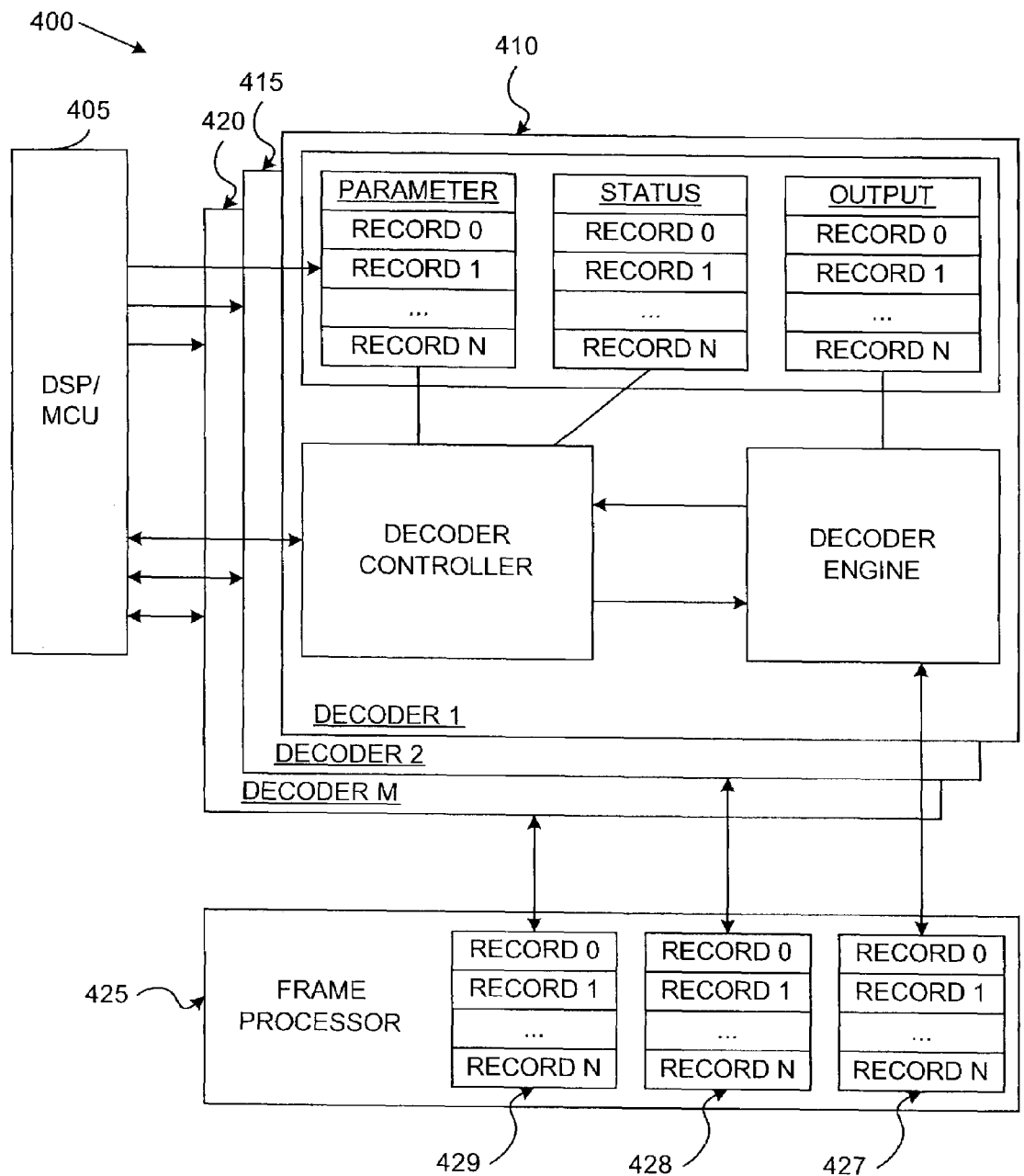
FIG. 4 is a diagram of a receiver with a plurality of decoders, each designed for batched processing of received data, according to a preferred embodiment of the present invention.

With reference now to FIG. 4, there is shown a diagram illustrating an exemplary receiver 400 with a plurality of decoders controlled by a DSP, according to a preferred embodiment of the present invention. The exemplary receiver 400, as displayed in FIG. 4, includes a DSP 405 that can be used to control a plurality of decoders 410, 415, and 420 among other things. According to a preferred embodiment of the present invention, the decoders, of which there may be a total of M (wherein M is a positive integer number), may share a similar basic architecture but do not necessary have to be identical to each other.

As displayed in FIG. 4, the decoder 410 has a basic architecture that may be similar to the decoder 210 (FIG. 2) in that it has a decoder memory that can be partitioned into parameter, status, and output partitions, and a decoder controller and a decoder engine. According to a preferred embodiment of the present invention, each of the M decoders share a similar basic architecture, but specifics (such as the number of records in the decoder memory partitions) may be different.

The DSP 405 may, at each radio frame, program the parameter partition of each of the decoders 410, 415, and 420. Once again, after an initial programming operation, the DSP 405 is not required to further program any of the parameter partitions if there is no change to any of the parameters. Additionally, the DSP 405 may program the parameters for one or more of the decoders without having to program the parameters for the remaining decoders.

The receiver 400 also includes a frame processor 425 which may serve a similar function as the frame processor 235 (FIG. 2) with the exception that the frame processor 425 may have a plurality of memories to hold information relation to the combination of multipath images for each of the decoders 410, 415, and 420. Additionally, the frame processor 425 may have multiple functional units to perform tasks such as deinterleaving and rate matching. Once gain, each of the memories may be organized on a record basis in a manner similar to the memory 237 (FIG. 2) of the frame processor 235.

Once the DSP 405 programs the parameters for each of the decoders 410, 415, and 420, the decoders 410, 415, and 420 may be free to decode the received data based on a prioritized list that the DSP may have provided to each of them. According to a preferred embodiment of the present invention, the DSP 405 provides to each of the decoders 410, 415, and 420 a separate prioritized list that is unique to the parameters programmed in their respective parameter partitions.

The remainder of the decoder operation is similar to the operation of the single decoder receiver 200 discussed in FIG. 2. As each decoder completes an item from the prioritized list, the decoder's decoder engine can write the results of the decoding operation into the decoder's output partition while the decoder's decoder controller can update the status of the decoding operation in the decoder's status partition. Also, each decoder may interrupt the DSP 405 whenever they reach a point in the decoding process where the DSP 405 requests that they assert an interrupt.

The prioritized list idea can be extended when it comes to multiple decoders being controlled by a single DSP. In addition to having specific parameters being assigned priorities and subsequently executed in order of their priorities, the multiple decoders may be assigned based on priorities. For example, a subset of the decoders may have a higher priority than the remaining decoders and when it comes to assigning parameters to the decoders, the decoder assignments will be based on decoder priority. Alternatively, the parameter priorities and decoder priorities can be used in conjunction with one another and the assignment of specific parameters to specific decoders may be based on both of the parameter and decoder priorities.

Figure 5:
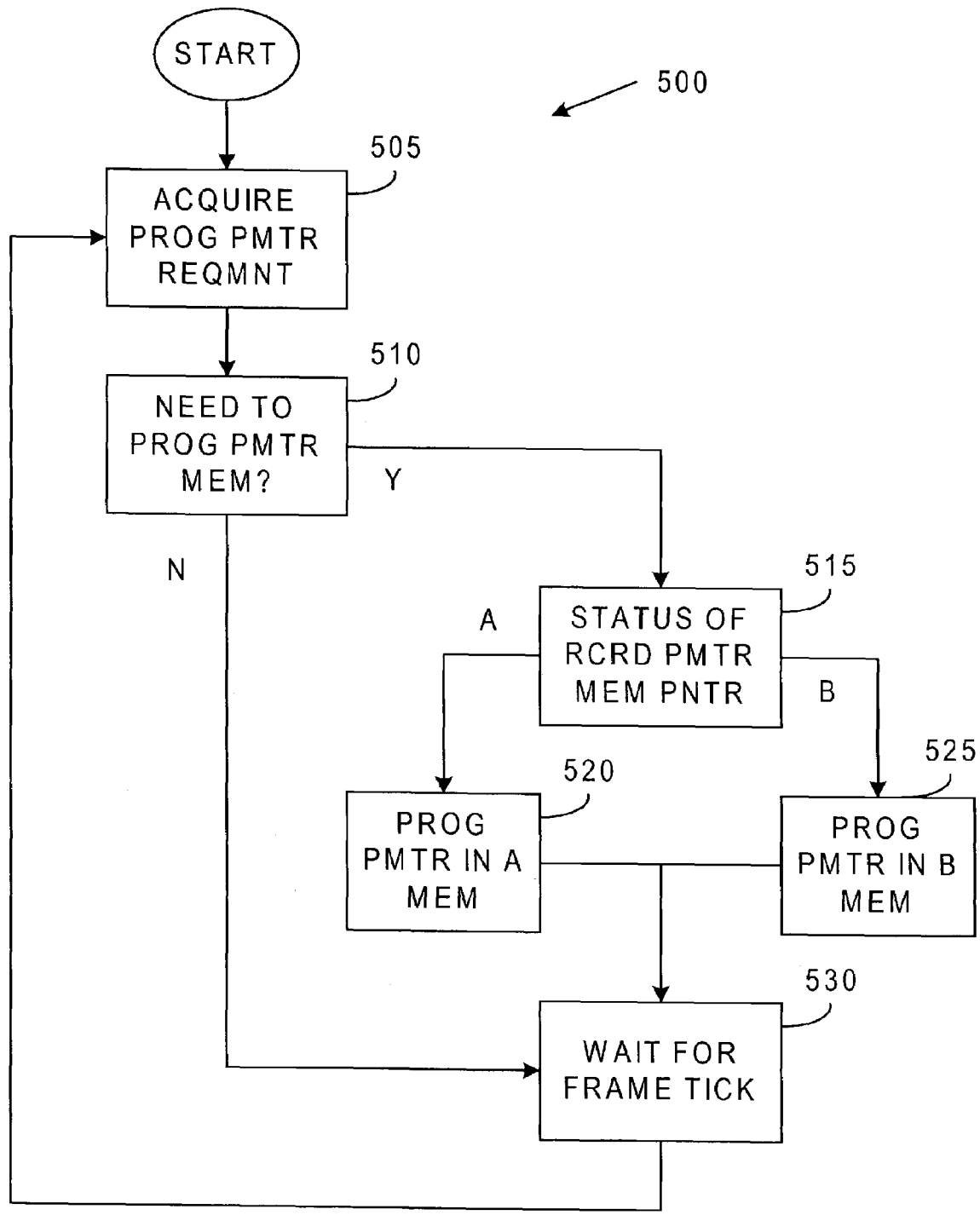
FIG. 5 is a flow diagram of an algorithm used by a digital signal processor to program a decoder, according to a preferred embodiment of the present invention.

With reference now to FIG. 5, there is shown a flow diagram illustrating an algorithm 500 that may be used by a DSP to program the operation of a decoder, according to a preferred embodiment of the present invention. According to a preferred embodiment of the present invention, the algorithm 500 may execute on a DSP (such as the DSP 205 (FIG. 2)) of a receiver (such as the receiver 200 (FIG. 2)). Alternatively, the algorithm 500 may execute on a MCU, a processing unit, a processing element, an ASIC, a microcontroller, or so forth, which may be used for controlling the operation of the receiver.

The DSP 205 may begin in block 505 by acquiring parameter programming requirements. For example, upon initialization, the DSP 205 may determine that it needs to program a decoder (such as the decoder 210) with sets of parameters, one for each decoding operation that the DSP 205 wishes for the decoder 210 to perform. However, after the receiver 200 starts operation, the DSP 205 may determine that it needs to modify only a subset of the total number of sets of parameters, or provide the decoder 210 with totally new sets of parameters, or do nothing. According to a preferred embodiment of the present invention, whether the DSP 205 wishes to change one or all of the sets of parameters, the DSP 205 may be required to program the decoder 210 with all of the sets of parameters. If the DSP 205 does not need to make any modifications to any of the sets of parameters, then the DSP 205 may not be required to program the decoder 210 at all.

Depending on the parameter programming requirements, the DSP 205 checks to see if it needs to program the decoder 210 (block 510). If the DSP does not need to program the decoder 210, then the DSP 205 can be free to perform any of its other required tasks and need not concern itself with programming the decoder 210 again until the arrival of a next radio frame tick (if the DSP 205 is idle, it may elect to simply wait for the arrival of the next radio frame tick (block 530)).

If however, the DSP 205 needs to program the decoder 210, then the DSP 205 may check a status of a pointer (possibly a register or a memory location or a value on a signal flag line) that can be used to store a value that indicates an active part of a parameter memory (such as the parameter memory 217 (FIG. 2)) (block 515). For example, if the parameter memory 217 is divided into two parts, a part A and a part B, then the pointer can contain a value corresponding to the part A if the part A is active. Alternatively, the pointer may contain a value corresponding to the part that is inactive, the one where the DSP 205 should write the sets of parameters.

After the DSP 205 completes its programming of the decoder 210, the DSP 205 may be free to perform any of its other required tasks. Alternatively, the DSP 205 may elect to remain idle until the arrival of the next radio frame it. Note that whether the DSP 205 goes off to perform other tasks or sits idle, the DSP 205 can still respond to interrupts asserted by the decoder 210 (and other devices).

Figure 6:
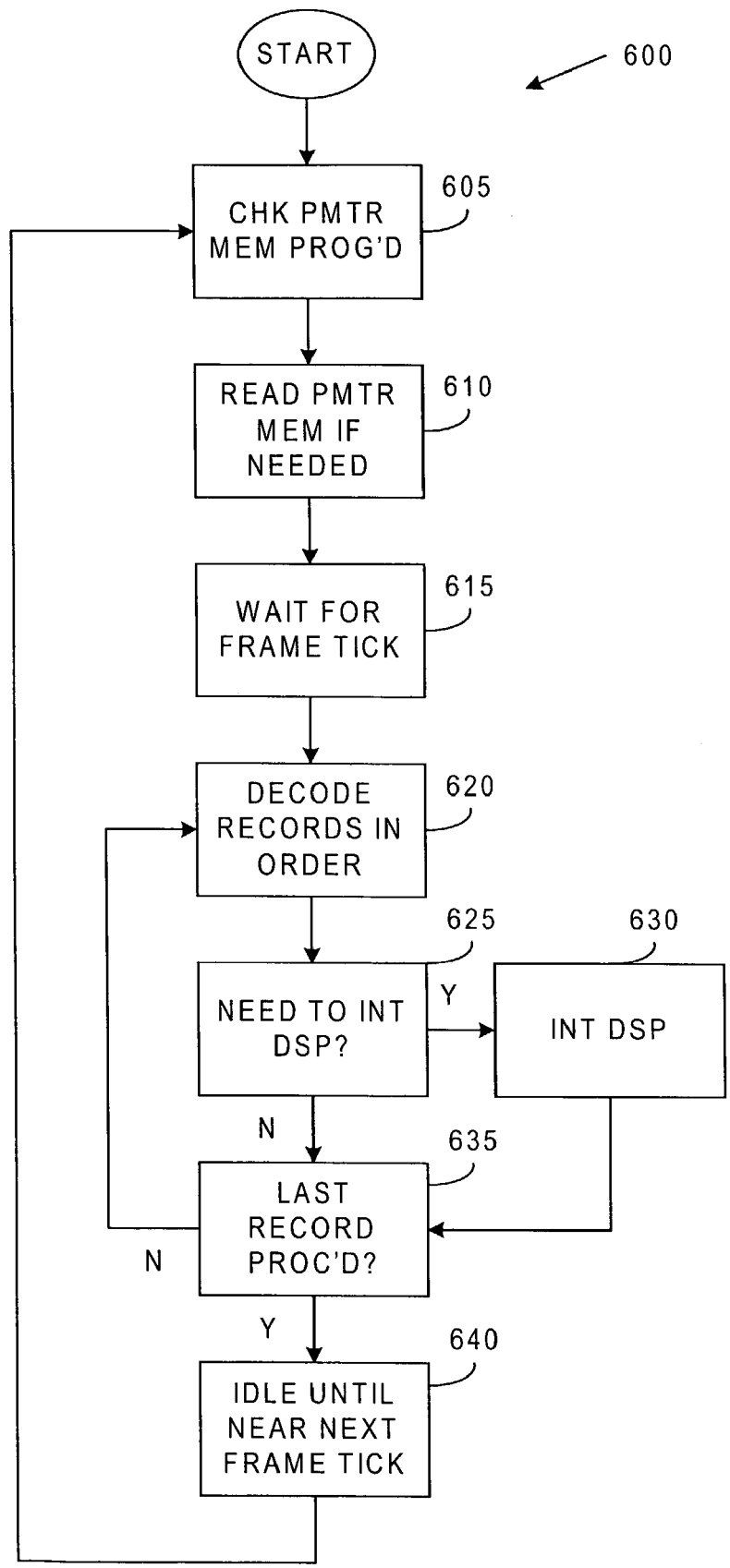
FIG. 6 is a flow diagram of an algorithm used by a decoder controller for batch processing of received data, according to a preferred embodiment of the present invention.

With reference now to FIG. 6, there is shown a flow diagram illustrating an algorithm 600 that may be used by a decoder controller (such as the decoder controller 225 (FIG. 2)) to decode received data as specified by a DSP (such as the DSP 205), according to a preferred embodiment of the present invention. According to a preferred embodiment of the present invention, the algorithm 600 may execute on the decoder controller 225 of a decoder (such as the decoder 210 (FIG. 2)).

The decoder controller 225 may, at a time that is slightly before the arrival of a new radio frame tick (or near the end of a current radio frame), check a value of a pointer (possibly a register or a memory location or perhaps a value on a signal flag line) (block 605). The value of the pointer can indicate to the decoder controller 225 where to read the parameters that are provided by the DSP 205 (block 610). For example, depending on the value of the pointer, the decoder controller 225 can read from part A of a parameter partition (such as the parameter partition 227 (FIG. 2)) or from part B. Alternatively, the pointer indicate to the decoder controller 225 where not to read.

Then, at the beginning of the new radio frame (as indicated by a radio frame tick), the decoder controller 225 may begin to decode the received data in order as specified in a prioritized list that may be provided to the decoder controller 225 by the DSP 205 (block 620). As the decoder controller 225 receives an indication from a decoder engine (such as the decoder engine 230 (FIG. 2)) that a particular decoding operation is complete, the decoder controller 225 checks to see if it needs to interrupt the DSP 205 (block 625). As discussed previously, the DSP 205 may specify to the decoder controller 225 when to assert interrupts. If the DSP 205 needs to be interrupted, the decoder controller 225 asserts an interrupt (block 630).

If the DSP 205 does not need to be interrupted or after the decoder controller 225 has asserted an interrupt (block 630), the decoder controller 225 may check to determine if there are any remaining decoding operations (block 635). If there are remaining decoding operations, then the decoder controller 225 can return to block 620 to perform the decoding. If there are no more decoding operations, the decoder controller 225 can become idle until a time slight before the arrival of the next radio frame (block 640).

Modem wireless communications systems can use relatively complex encoding schemes to help assure the accurate delivery of the information carried in their transmissions. Additionally, many of them support multiple data rates within in a single communications channel. Others may allow data of high priority to be transmitted at the expense of lower priority data by puncturing the lower priority data transmission with the high priority data.

Figure 7:
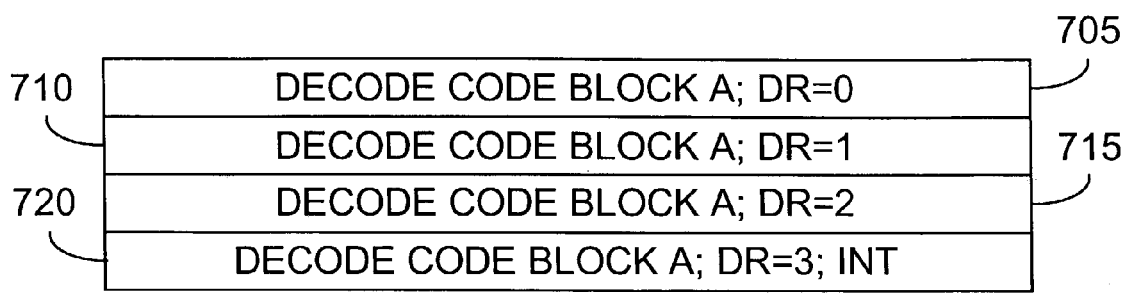
FIG. 7 is a table of parameter excerpts for decoding a code block with several different data rates, according to a preferred embodiment of the present invention.

With reference now to FIG. 7, there is shown a diagram illustrating an exemplary excerpt from some decoder parameters which may be used to decode a communications channel that supports multiple data rates, according to a preferred embodiment of the present invention. The communications channel to be decoded can support multiple data rates, and the receiver may not know at what rate the data is being transmitted until it has actually successfully decoded the data. Using a prior art decoder, a DSP may be forced to program a decoder to attempt to decode a code block at a first data rate and report the results back to the DSP several times before the actual data rate is determined.

However, using a preferred embodiment of the present invention, the DSP can simply program the decoder with several sets of parameters, wherein each may specify that the decoder decodes the code block with a specified data rate. For example, a first parameter excerpt 705 may tell the decoder to decode the code block with a data rate 0, while a second parameter excerpt 710 may tell the decoder to decode the same code block with a data rate 1, and so on. After the decoder completes, the decoder can interrupt the DSP to provide it with the results of the decoding operations (as specified in a fourth parameter excerpt 720).

Figure 8:
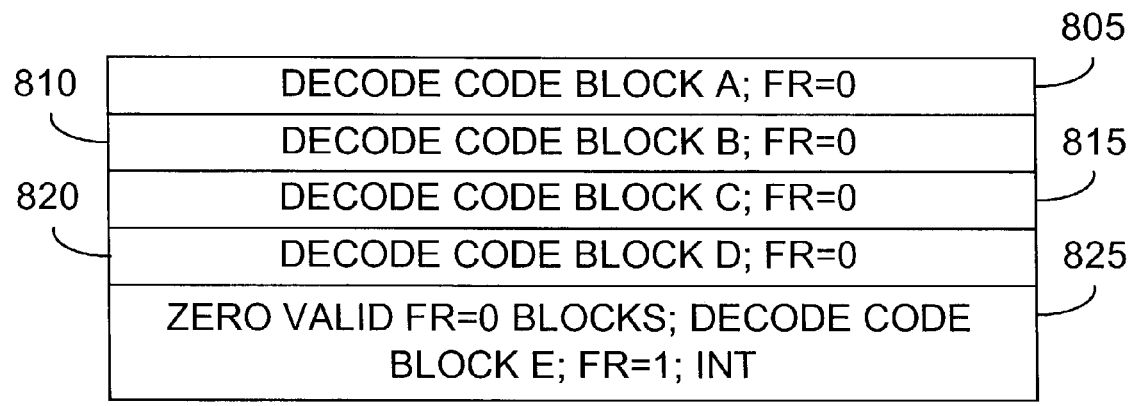
FIG. 8 is a table of parameter excerpts for decoding a communications channel with punctured code blocks, according to a preferred embodiment of the present invention.

With reference now to FIG. 8, there is shown a diagram illustrating an exemplary excerpt from some decoder parameters which may be used to decode a communications channel that supports the puncturing of low priority data transmissions (transmitted at a frame rate 1) with shorter duration high priority data (transmitted at a frame rate 0), according to a preferred embodiment of the present invention. The communications channel to be decoded can support puncturing of the low priority data with short duration blocks of high priority data. The receiver may not know if puncturing has taken place and where in the radio frame the punctured data resides. Using a prior art decoder, a DSP may be forced to decode the various code blocks of the communications channel with multiple frame rates before the communications channel can be successfully decoded.

However, using a preferred embodiment of the present invention, the DSP can program the decoder with several sets of parameters, wherein each may specify that the decoder decodes a specified code block at a given frame rate. For example, a first parameter excerpt 805 tells the decoder to decode a first code block (block A) with a given frame rate 0, while a second parameter excerpt 810 tells the decoder to decode a second code block (block B) with a given frame rate 0, and so on for blocks C and D.

Each of the decoding operations specified in excerpts 805 through 820 can result in the determination if the code blocks (A, B, C, and D) are encoded at frame rate 0. This may be determined by a cyclic redundancy check for each of the code blocks. If any of the code blocks are valid frame rate 0 code blocks, then the code block is zeroed out prior to the group of four code blocks are to be decoded at a second frame rate (frame rate 1). Note that if all four of the code blocks are valid frame rate 0 code blocks, then the attempt of decoding the group of four code blocks at frame rate 1 is not to be performed.

After the completion of the decoding based on excerpt 820, the decoder processes excerpt 825, which tells it to first zero out any code block that was successfully decoded at frame rate 0 and then decode a code block made up of the four code blocks A, B, C, and D (collectively referred to as code block E) at a frame rate 1. A simple check to determine if all four code blocks (A, B, C, and D) were successfully decoded at frame rate 0 can allow the decoder to skip the decoding of code block E at frame rate 1. Once the decoder completes excerpt 825, it may interrupt the DSP to provide the results of the decoding.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   programming a plurality of sets of decoding parameters by a control unit selected from the group consisting of a DSP (digital signal processor) and a MCU (mobile control unit) and a micro-controller and ASIC and a CPU;
   wherein the control unit governs a substantially entire system;
   reading the plurality of sets of decoding parameters from a memory;
   decoding received data based on a set of decoding parameters;
   conducting the decoding based on a prioritization and with reduced interaction with the control unit; and
   checking if the control unit needs to be interrupted after each decoding completes:
   storing decoding results based on the set of decoding parameters; and
   repeating the decoding and storing for each set of decoding parameters.

2. The method of claim 1, wherein the method is repeated for each frame of data received.

3. The method of claim 1, wherein the plurality of sets of decoding parameters is provided by a control unit.

4. The method of claim 1, wherein the plurality of sets of decoding parameters is provided by a control unit, and wherein when the control unit changes one or more sets of decoding parameters, the control unit writes the plurality of sets of decoding parameters to the memory.

5. The method of claim 4, wherein the method is repeated for each frame of data received, and when the control unit writes the plurality of sets of decoding parameters to the memory during the receipt of a current frame of data, the newly written plurality of sets of decoding parameters is used in the decoding of data from an immediately following frame of data.

6. The method of claim 1, wherein the plurality of sets of decoding parameters is provided by a control unit, and wherein when the control unit makes no changes to any set of decoding parameters, the plurality of sets of decoding parameters already in the memory is reused.

7. The method of claim 1 further comprising after a first reading:
reading a prioritized list provided by the control unit; and
ordering the sets in the plurality of sets of decoding parameters based on the prioritized list.

8. The method of claim 1 further comprising after the first storing, storing a status of the decoding based on the set of decoding parameters.

9. The method of claim 1, wherein the set of decoding parameters specify where to store the decoding results.

10. The method of claim 1 further comprising the step of interrupting the control unit by the decoder, wherein a criteria of interrupting is determined by the control unit.

11. A decoder comprising:
a decoder memory, the decoder memory to hold sets of decoding parameters provided by a control unit and results from decoding operations; wherein the control unit provides parameters only if there is a change in the parameters;
a decoder engine coupled to the decoder memory, the decoder engine containing circuitry to decode received data based on specifications from a set of decoding parameters; and
a decoder controller coupled to the decoder engine and the decoder memory, the decode controller containing circuitry to initiate decodes of received data in the decoder engine based on sets of decoding parameters stored in the decoder memory; and
the decoder controller containing circuitry to check if it needs to interrupt the control unit as each decode completes.

12. The decoder of claim 11, wherein the decoder memory comprises:
a parameter partition to hold sets of decoding parameters;
a status partition to hold decoding status; and
an output partition to hold decoding results; and
a prioritized list to decode the received data.

13. The decoder of claim 12, wherein the parameter partition is organized into records, with each record to hold a set of decoding parameters.

14. The decoder of claim 12, wherein the status and output partitions are also organized into records, with each record associated with a set of decoding parameter, and wherein the association is specified by the set of decoding parameters.

15. The decoder of claim 12, wherein the parameter partition comprises two portions, and wherein when the control unit provides the sets of decoding parameters, a portion not currently being accessed by the decoder controller is used to hold the sets of decoding parameters.

16. The decoder of claim 15, wherein a pointer is used to identify the portion of the parameter partition being accessed by the decoder controller.

17. The decoder of claim 15, wherein a pointer is used to identify the portion of the parameter partition to be used to hold the sets of decoding parameters provided by the control unit.

18. The decoder of claim 11 further comprising more than one independent decoder, each configured to be programmed by the control unit and to receive a prioritized list from the control unit to decode received data.

19. A receiver comprising:
a control unit, the control unit to regulate the operation of the receiver;
wherein the control unit is operable to govern the substantially entire receiver;
a decoder coupled to the control unit, the decoder containing circuitry to batch decode received data based on sets of parameters provided by the control unit; wherein the control unit provides the sets of parameters only if there is a change in the parameters and the control unit provides higher priority parameters listed above lower priority parameters; and
a frame processor coupled to the decoder, the frame processor to store received data.

20. The receiver of claim 19, wherein the decoder comprises:
a decoder memory, the decoder memory to hold sets of decoding parameters provided by the control unit and results from decoding operations;
a decoder engine coupled to the decoder memory, the decoder engine containing circuitry to decode received data based on specifications from a set of decoding parameters; and a decoder controller coupled to the decoder engine and the decoder memory, the decode controller containing circuitry to initiate decodes of received data in the decoder engine based on sets of decoding parameters stored in the decoder memory.

21. The receiver of claim 20, wherein a part of the decoder memory used to hold the sets of decoding parameters is referred to as a parameter partition, and wherein the parameter partition is organized into records, with each record to hold a set of decoding parameters.

22. The receiver of claim 20, wherein the parameter partition comprises two portions, and wherein when the control unit provides the sets of decoding parameters, a portion not currently being accessed by the decoder controller is used to hold the sets of decoding parameters.

23. The receiver of claim 18, wherein the frame processor comprises a frame processor memory to store information used to combine symbols in the received data to maximize quality of the received data.

24. The receiver of claim 23, wherein the frame processor memory is organized into records, with each record to store information used to combine symbols in the received data to maximize quality of the received data.

25. The receiver of claim 19, wherein there is a plurality of decoders coupled to the control unit.

26. The receiver of claim 25, wherein the frame processor is coupled to each decoder.

27. The receiver of claim 25, wherein each decoder in the plurality of decoders are identical.

28. The receiver of claim 25, wherein the decoders in the plurality of decoders may be different.

29. The receiver of claim 25, wherein the decoders in the plurality of decoders may have different priorities, and wherein the assignment of the decoders may depend upon decoder priority.

30. The receiver of claim 29, wherein the decoding parameters also have priorities, and wherein the assignment of the decoding parameters to the decoders may depend upon both decoder and decoding parameter priorities.

31. The receiver of claim 19, wherein the receiver is part of wireless device operating in a wireless communications network.

32. The receiver of claim 31, wherein the wireless communications network is a code-division multiple access (CDMA) network.

33. The receiver of claim 31, wherein the wireless communications network is a CDMA2000 compliant network.

34. The receiver of claim 31, wherein the wireless communications network is a Universal Mobile Telecommunications System (UMTS) compliant network.

35. The receiver of claim 19, wherein the control unit is a digital signal processor (DSP).

36. The receiver of claim 19, wherein the control unit is a mobile control unit (MCU).

* * * * *